W. D. STONER.
FASTENING DEVICE FOR TIRE PROTECTORS, &c.
APPLICATION FILED FEB. 9, 1918.
1,278,783.
Patented Sept. 10, 1918.
Fig. 1.
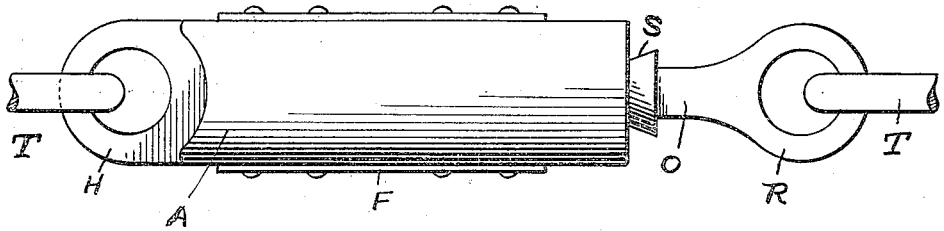
Fig. 2.
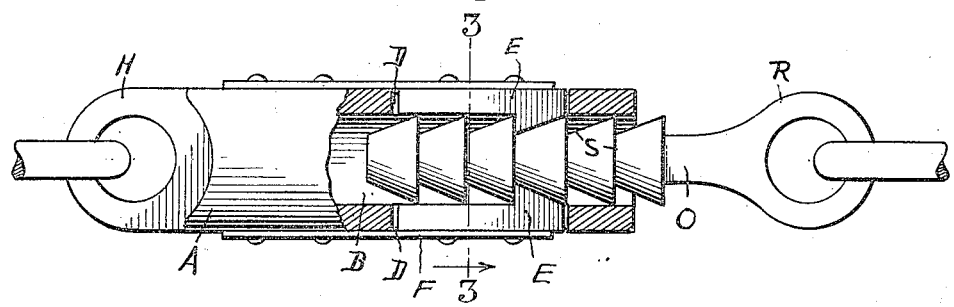
Fig. 3.
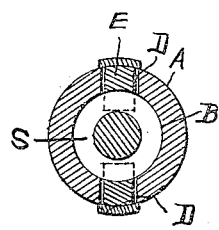
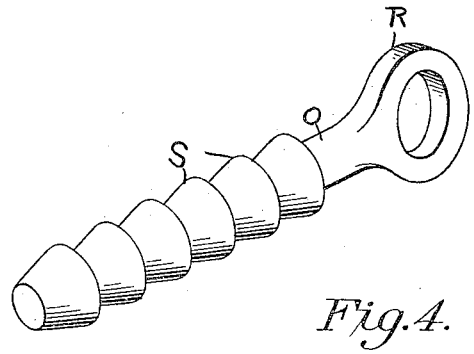
Fig. 4.
Witness
Fenton S. Belt
Inventor
Willis D. Stoner
By Franklin H. Hough
Attorney

UNITED STATES PATENT OFFICE.

WILLIS D. STONER, OF SPRINGFIELD, OHIO, ASSIGNOR OF ONE-HALF TO HARVEY H. STONER, OF SPRINGFIELD, OHIO.

FASTENING DEVICE FOR TIRE-PROTECTORS, &c.

1,278,783.

Specification of Letters Patent. Patented Sept. 10, 1918.

Application filed February 9, 1918. Serial No. 216,339.

*To all whom it may concern:*

Be it known that I, WILLIS D. STONER, a citizen of the United States, residing at Springfield, in the county of Clark and State of Ohio, have invented certain new and useful Improvements in Fastening Devices for Tire-Protectors, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvments in devices for fastening anti-skid and protecting devices upon the tires of wheels, and consists in the provision of a simple and efficient device of this nature having various details of construction, combinations and arrangements of parts which will be hereinafter fully described, shown in the accompanying drawings and then specifically defined in the appended claim.

The invention is illustrated in the accompanying drawings which, with the letters of reference marked thereon, form a part of this specification and in which:

Figure 1 is a view in elevation showing the device connected together.

Fig. 2 is a central sectional view longitudinally through the parts connected together.

Fig. 3 is a cross sectional view, and

Fig. 4 is a detail perspective view of one of the fastening ends.

Reference now being had to the details of the drawings by letter:

A designates a socket member of cylindrical shape and having a chambered portion B the walls of which are provided with oppositely disposed elongated slots D. Dogs E are positioned one in each of said slots and each is fastened to a spring F which latter is secured to the wall of the socket member. The inner engaged ends of the dogs are positioned within the bore of the socket member and are normally held in the positions shown in the longitudinal view through the medium of said spring. One end of the socket member is provided with an eye H to which the link N of a chain is adapted to be attached. A plug O has an eye R at one end adapted to be attached to the link T of the chain. Said plug O is provided with a series of conical shaped shouldered portions S and which are adapted to be engaged by the oppositely disposed dogs E and serve as means for holding the plug in different adjusted positions relative to the socket member in which it is positioned according as it may be desired to draw the ends of the chain together.

By the provision of a fastening means embodying the features of my invention, it will be noted that the plug may be held in different positions axially and longitudinally and still be engaged by the dogs to hold the ends of the chain to which the fastening-devices are secured in different positions.

While my invention is shown as being attached for holding the ends of anti-skid chains and protecting device upon the tires of automobiles, it will be understood that it may be applied for various purposes where ends of chains or cables, etc., are to be connected together.

What I claim to be new is:

A device for fastening anti-skid chains, consisting of a cylindrical socket member with a recess therein, the opposite walls of the recess provided with elongated slots, springs fastened to the outer face of the member, dogs secured to said springs and fitted within said elongated slots with their outer faces flush with the cylindrical circumference of the member, a solid plug made up of a continuous series of conical-shaped portions adapted to be inserted in the recess of said member and to be engaged at points diametrically opposite by said dogs, said plug adapted to have a swiveled movement when in engagement with said dogs.

In testimony whereof I hereunto affix my signature in presence of two witnesses.

WILLIS D. STONER.

Witnesses:
A. L. HOUGH,
FRANKLIN H. HOUGH.

Copies of this patent may be obtained for five cents each, by addressing the "Commissioner of Patents, Washington, D. C."